United States Patent [19]
Reimer et al.

[11] Patent Number: 6,021,170
[45] Date of Patent: Feb. 1, 2000

[54] NUCLEAR REACTOR PLANT HAVING A REACTOR PRESSURE VESSEL WITH A CORE BARREL AND METHOD FOR MOUNTING THE CORE BARREL

[75] Inventors: Gerd Reimer; Herbert Schramm, both of Höchstadt, Germany

[73] Assignee: Siemens Aktiengesellschaft, Munich, Germany

[21] Appl. No.: 09/151,960

[22] Filed: Sep. 11, 1998

Related U.S. Application Data

[63] Continuation of application No. PCT/EP97/01008, Feb. 28, 1997.

[30] Foreign Application Priority Data

Mar. 11, 1996 [DE] Germany .......................... 196 09 350

[51] Int. Cl.[7] .................................................. G21C 19/00
[52] U.S. Cl. ..................... 376/261; 376/287; 376/461
[58] Field of Search .................................. 376/260, 285, 376/287, 302, 304, 434, 446, 453, 461; 29/723; 220/23.9, 62.11, 918, 476

[56] References Cited

U.S. PATENT DOCUMENTS

| | | | |
|---|---|---|---|
| 3,947,322 | 3/1976 | Dorner et al. | 176/87 |
| 4,097,332 | 6/1978 | Gibbons et al. | 176/87 |
| 4,124,447 | 11/1978 | Gross | 176/87 |
| 4,671,923 | 6/1987 | Davidson | 376/285 |
| 4,711,760 | 12/1987 | Blaushild | 376/399 |
| 4,743,054 | 5/1988 | Lavalerie | 292/256.67 |
| 4,756,877 | 7/1988 | Veronesi et al. | 376/362 |
| 5,065,490 | 11/1991 | Wivagg et al. | 29/402.17 |
| 5,259,010 | 11/1993 | Brown et al. | 376/446 |
| 5,265,141 | 11/1993 | Kobsa | 376/446 |
| 5,502,754 | 3/1996 | Erbes | 376/302 |
| 5,519,744 | 5/1996 | Relf | 376/287 |
| 5,583,899 | 12/1996 | Relf | 376/287 |
| 5,621,778 | 4/1997 | Erbes | 376/302 |
| 5,802,129 | 9/1998 | Deaver et al. | 376/287 |

FOREIGN PATENT DOCUMENTS

| | | | |
|---|---|---|---|
| 1186956 | 2/1965 | Germany . | |
| 1211374 | 2/1966 | Germany . | |
| 60-7387 | 1/1985 | Japan . | |
| 62-228971 | 10/1987 | Japan . | |
| 8-86896 | 2/1996 | Japan . | |
| 1004546 | 2/1964 | United Kingdom | 376/461 |

*Primary Examiner*—Charles T. Jordan
*Assistant Examiner*—Jack Keith
*Attorney, Agent, or Firm*—Herbert L. Lerner; Laurence A. Greenberg

[57] ABSTRACT

A nuclear reactor plant includes a reactor pressure vessel having a core barrel supported on a cylindrical holding structure fixed in the reactor pressure vessel. The core barrel has a lower part with at least one elastically resilient segment. A projection disposed on the segment engages under the holding structure in such a way that a wedge-like gap is formed between a lower surface of the holding structure and the projection. A wedge is braced in the gap. A method is also provided for mounting the core barrel.

7 Claims, 2 Drawing Sheets

NUCLEAR REACTOR PLANT HAVING A REACTOR PRESSURE VESSEL WITH A CORE BARREL AND METHOD FOR MOUNTING THE CORE BARREL

CROSS-REFERENCE TO RELATED APPLICATION

This application is a continuation of copending International Application No. PCT/EP97/01008, filed Feb. 28, 1997, which designated the United States.

BACKGROUND OF THE INVENTION

1. Field of the Invention

The invention relates to a nuclear reactor plant having a reactor pressure vessel with a core barrel and to a method for mounting a core barrel.

A core barrel is disposed in a reactor pressure vessel of a nuclear reactor plant receiving a reactor core. During operation, particularly in the case of a boiling water reactor plant, a core barrel which is known, for example, from the AEG-Telefunken-Handbuch [AEG-Telefunken Manual], Volume 10, "Siedewasser-reaktoren für Kernkraftwerke" ["Boiling water Reactors for Nuclear Power Stations"], Andrej Sauer, Berlin 1969, page 100, may suffer damage to weld seams located on its casing. It may then be necessary, in view of that damage, to remove the old core barrel from the reactor pressure vessel and replace it with a new core barrel. It is necessary, for that purpose, to separate the old core barrel mechanically from an essentially cylindrical lower part (core barrel residue) remaining in the reactor pressure vessel. The new core barrel then has to be placed onto that lower part, fitted into the reactor pressure vessel and fixed in the latter.

SUMMARY OF THE INVENTION

It is accordingly an object of the invention to provide a nuclear reactor plant having a reactor pressure vessel with a core barrel and a method for mounting the core barrel, which overcome the hereinafore-mentioned disadvantages of the heretofore-known devices and methods of this general type and in which the core barrel can be mounted simply and reliably on a holding structure that has remained in the reactor pressure vessel after the removal of the old core barrel.

With the foregoing and other objects in view there is provided, in accordance with the invention, a nuclear reactor plant, comprising a reactor pressure vessel; a holding structure fixed to the reactor pressure vessel, the holding structure having a lower surface; a core barrel supported on the holding structure, the core barrel including a lower part having at least one elastically resilient segment with a projection engaging under the holding structure and defining a wedge-like gap between the lower surface of the holding structure and the projection; and a wedge braced in the gap.

These structural features permit simple mounting. The new core barrel can simply be pushed onto the holding structure and fixed through the use of wedges by virtue of the elastically resilient segments. This is accomplished without further preliminary mechanical work being necessary, for example the machining of bores or threads for receiving screws.

In accordance with another feature of the invention, the projection is beveled on its surface facing away from the gap in order to be led past the holding structure.

In accordance with a further feature of the invention, the wedge is braced in the gap through the use of a screw disposed in the segment and acting on an end surface of the wedge.

In accordance with an added feature of the invention, the wedge-like gap tapers in the radial direction toward the reactor pressure vessel, and the wedge is braced in the gap through the use of pressure force exerted by the screw.

In accordance with an additional feature of the invention, the screw is secured by a device for securing against rotation.

In accordance with yet another feature of the invention, a groove is provided on the outer periphery of the lower part, parallel to a longitudinal direction of the latter, and the lower part is pushed onto the holding structure through the use of the groove.

With the objects of the invention in view there is also provided a method for mounting a core barrel in a reactor pressure vessel of a nuclear reactor plant, which comprises fixing a cylindrical holding structure to the reactor pressure vessel and providing the holding structure with a lower surface; providing the core barrel with a lower part having at least one elastically resilient segment with a projection; placing the lower part onto the cylindrical holding structure with the projection engaging under the holding structure and forming a wedge-like gap between the lower surface of the holding structure and the projection; and bracing a wedge in the gap.

Other features which are considered as characteristic for the invention are set forth in the appended claims.

Although the invention is illustrated and described herein as embodied in a nuclear reactor plant having a reactor pressure vessel with a core barrel and a method for mounting the core barrel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
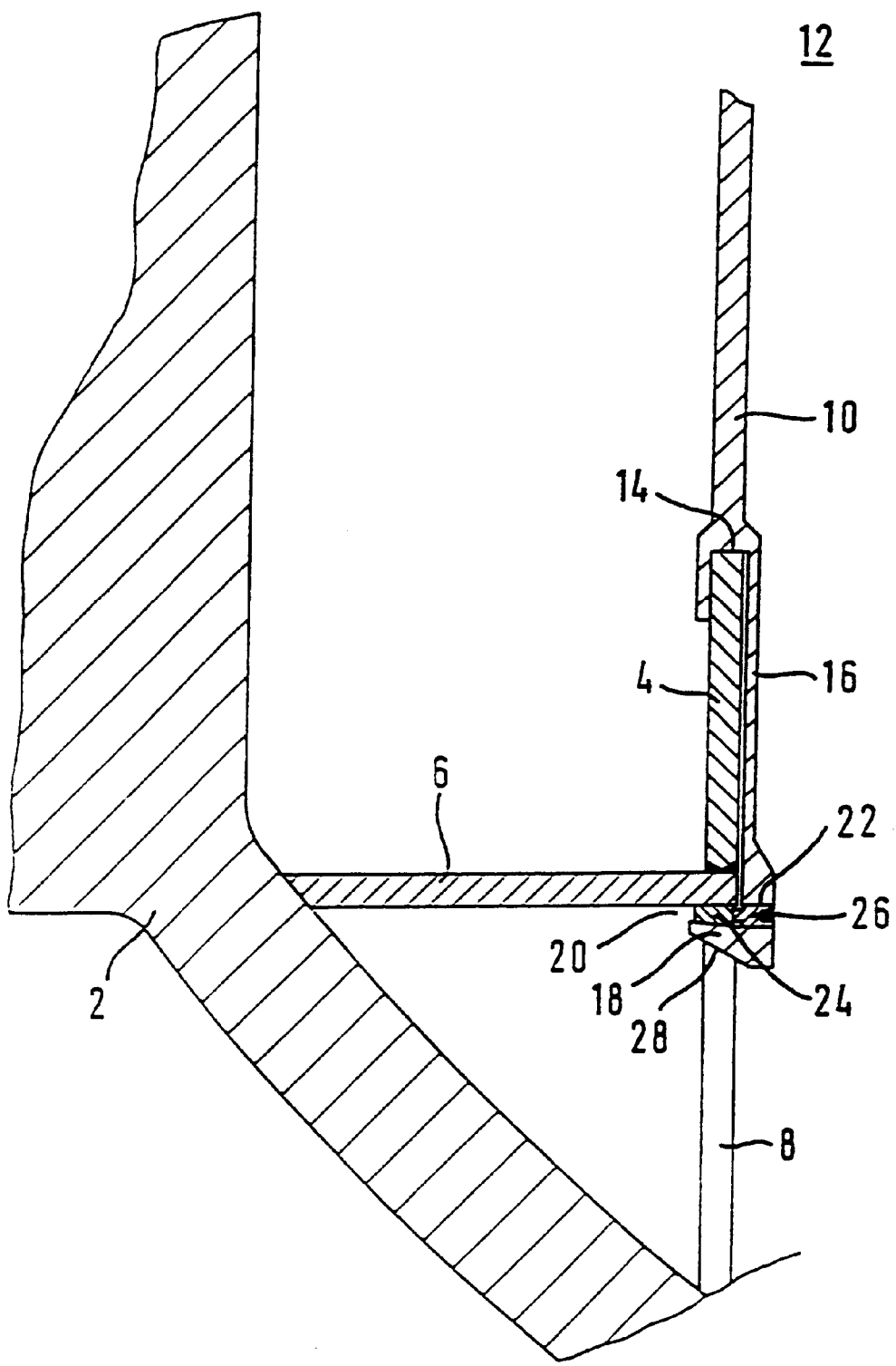
FIG. 1 is a fragmentary, diagrammatic, sectional view of a core barrel according to the invention installed in a reactor pressure vessel.

Referring now to the figures of the drawings in detail and first, particularly, to FIG. 1 thereof, there is seen an essentially annular or cylindrical holding structure 4 disposed in a reactor pressure vessel 2 and fixed to the reactor pressure vessel through lateral supports 6. The holding structure 4 has a pocket or orifice 8 below this lateral support 6. The holding structure 4 illustrated in the exemplary embodiment is a remainder or remnant which has remained in the reactor pressure vessel from an old core barrel.

A lower part 10 of a new core barrel 12 rests on the holding structure 4. For this purpose, a downwardly open U-shaped groove 14 is disposed on an outer periphery of the lower part 10, parallel to the longitudinal direction of the latter. The lower part 10 is pushed onto the cylindrical holding structure 4, and is secured against slipping laterally, through the use of the groove 14.

A plurality of segments 16 which are disposed on the lower part 10 have a reduced wall thickness and are constructed as a continuation of a side wall at the groove 14. Due to their reduced wall thickness, the segments 16 have an elastically resilient property.

The segments 16 are each provided, at their free end, with a hook-like projection 18 which engages under the holding structure 4 in the region of the orifice 8. A wedge-like gap 20 between the projection 18 and the holding structure 4 tapers toward an inner wall surface of the reactor pressure vessel 2. A wedge 24 is introduced into this gap 20 through a bore 22 in the segment 16. A screw 26 is screwed into the bore 22. The screw 26 exerts pressure force on an end surface of the wedge 24 and braces the latter in the gap 20.

The hook-like projection 18 has a beveled surface 28 facing away from the gap 20. This measure and the elastically resilient structure of the segment 16, permit the core barrel 12 to simply be pushed onto the holding structure 4. This is because the segment 16 is pressed away inward by the bevel of the projection 18 when the core barrel 12 is guided onto the holding structure 4.

Figure 2:
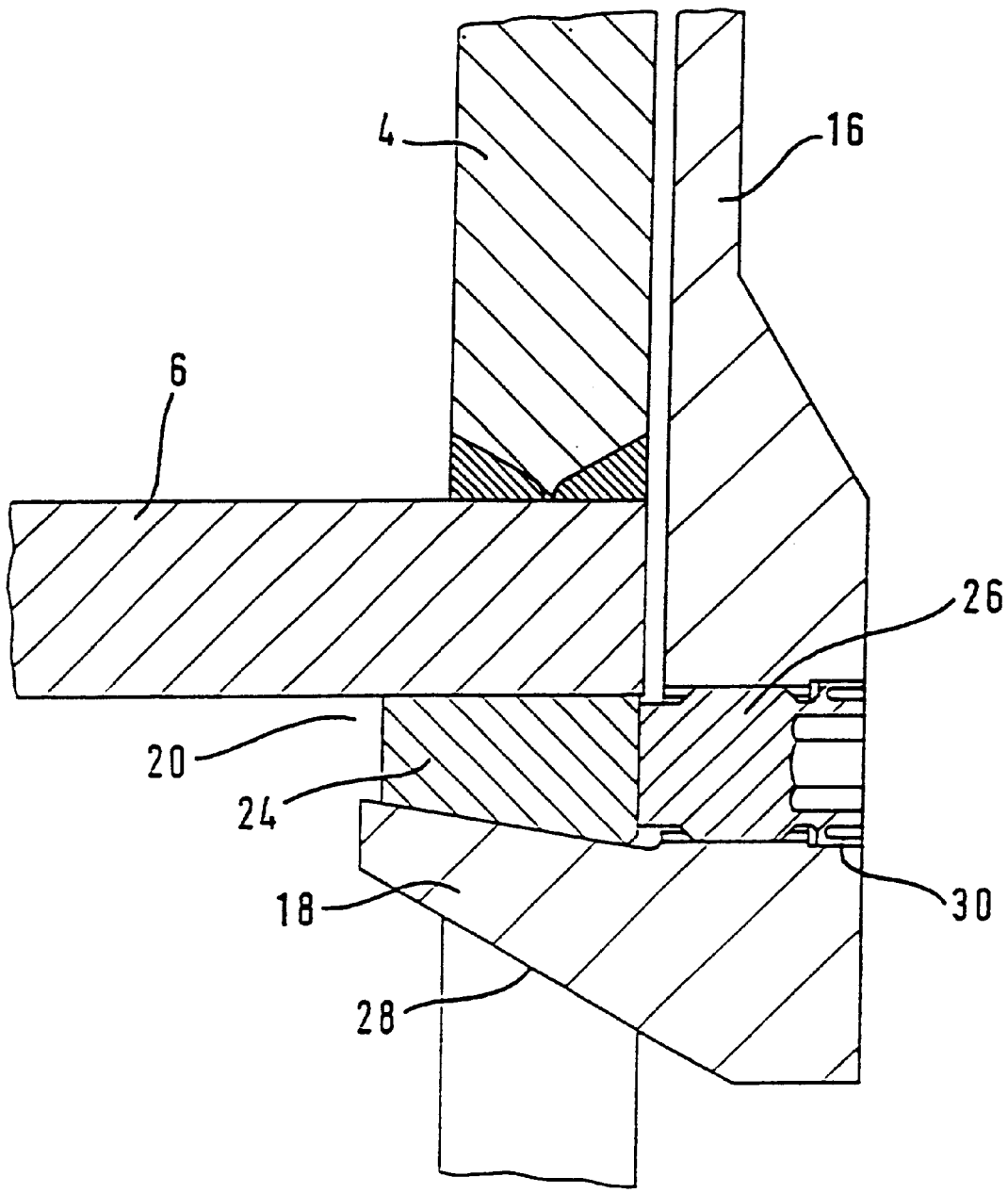
FIG. 2 is an enlarged, fragmentary, sectional view of a region of a wedge connection to a holding structure located in the reactor pressure vessel.

In the enlarged fragmentary view according to FIG. 2, it can be seen that a polygon socket screw is provided as the screw 26. The head of the screw 26 is provided with a retaining ring 30 which can be pressed into pockets correspondingly worked into the segment 16, as a device for securing the screw 26 against rotation.

We claim:

1. A nuclear reactor plant, comprising:

a reactor pressure vessel;

a holding structure fixed to said reactor pressure vessel, said holding structure having a lower surface;

a core barrel supported on said holding structure, said core barrel including a lower part having at least one elastically resilient segment with a projection engaging under said holding structure and defining a wedge-like gap between said lower surface of said holding structure and said projection; and a wedge braced in said gap.

2. The nuclear reactor plant according to claim 1, wherein said projection has a beveled surface facing away from said gap to be led past said holding structure.

3. The nuclear reactor plant according to claim 2, including a screw disposed in said segment and acting on an end surface of said segment, for bracing said wedge in said gap.

4. The nuclear reactor plant according to claim 3, wherein said gap tapers in radial direction toward said reactor pressure vessel and said wedge is braced in said gap by pressure force exerted by said screw.

5. The nuclear reactor plant according to claim 4, wherein said screw has a device for securing against rotation.

6. The nuclear reactor plant according to claim 1, wherein said lower part has a longitudinal direction and an outer periphery with a groove formed therein parallel to the longitudinal direction, and said holding structure is pushed into said groove.

7. In a method for mounting a core barrel in a reactor pressure vessel of a nuclear reactor plant, the improvement which comprises:

fixing a cylindrical holding structure to the reactor pressure vessel and providing the holding structure with a lower surface;

providing the core barrel with a lower part having at least one elastically resilient segment with a projection;

placing the lower part onto the cylindrical holding structure with the projection engaging under the holding structure and forming a wedge-like gap between the lower surface of the holding structure and the projection; and bracing a wedge in the gap.

* * * * *